Figure 1:
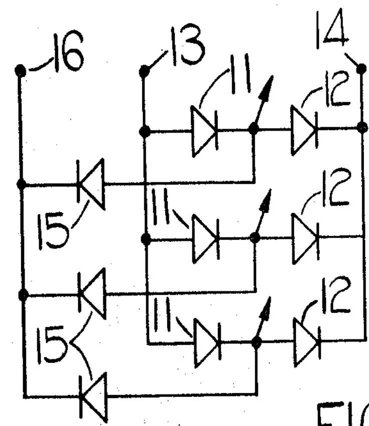

United States Patent

Cross et al.

[15] 3,665,287

[45] May 23, 1972

[54] FULL WAVE RECTIFIER ASSEMBLIES

[72] Inventors: Dennis Rowland Cross, Solihull, England; Edward Stephens, Station B, Ottawa, Canada

[73] Assignee: Joseph Lucas (Industries) Limited, Birmingham, England

[22] Filed: Mar. 25, 1970

[21] Appl. No.: 22,511

[30] Foreign Application Priority Data

Apr. 17, 1969 Great Britain......................19,578/69

[52] U.S. Cl...........................................321/8 R, 317/234 W

[51] Int. Cl...........................................................H02m 7/00

[58] Field of Search......................................317/234; 321/8

[56] References Cited

UNITED STATES PATENTS

| | | | |
|---|---|---|---|
| 3,160,771 | 12/1964 | Martin et al. | 321/8 X |
| 3,489,960 | 1/1970 | Hudman | 317/234 |

FOREIGN PATENTS OR APPLICATIONS

| | | | |
|---|---|---|---|
| 1,017,142 | 1/1966 | Great Britain | 317/234 |

*Primary Examiner*—William M. Shoop, Jr.

[57] ABSTRACT

In a full wave rectifier assembly an axially extending support member has a pair of terminal plates mounted on it but insulated from one another. Each terminal plate carries a number of diodes equal in number to the number of phases of the supply to be rectified, with the diodes carried by one terminal plate having their cathodes electrically connected thereto and the diodes carried by the other plate have their anodes electrically connected thereto. In addition, a plurality of phase plates equal to the number of phases to be rectified are fixed relative to the support member and are insulated from one another and from the terminal plates, leads interconnecting the diodes and phase plates ensuring that the arrangement acts as a full wave rectifier. The phase plates are constructed from a single plate around which is moulded an insulating body used to support the phase plates relative to the support member, and the original plate is split to separate the phase plates from one another.

4 Claims, 3 Drawing Figures

INVENTOR
Dennis Rowland Cross, Edward Stephens
Holman, Glascock, Downing & Seebold
ATTORNEYS

FULL WAVE RECTIFIER ASSEMBLIES

This invention relates to full wave rectifier assemblies.

An assembly according to the invention comprises in combination an axially extending support member, a pair of terminal plates mounted on said support member and insulated from one another, each terminal plate carrying a number of diodes equal in number to the number of phases of the supply to be rectified, the diodes carried by one terminal plate having their cathodes electrically connected thereto, and the diodes carried by the other terminal plate having their anodes electrically connected thereto, a plurality of phase plates equal to the number of phases to be rectified, the phase plates being fixed relative to the support member and being insulated from one another and from the terminal plates, and leads interconnecting the diodes and phase plates so that when the phase plates are connected to the phases of an a.c. source, a rectified supply will be obtained at the terminal plates, the phase plates being constructed from a single plate around which is moulded an insulating body used to support the phase plates relative to the support member, the original plate being split to separate the phase plates from one another.

Preferably, each phase plate is shaped so that the parts of each phase plate to which leads are secured are movable relative to each other axially.

Figure 3:
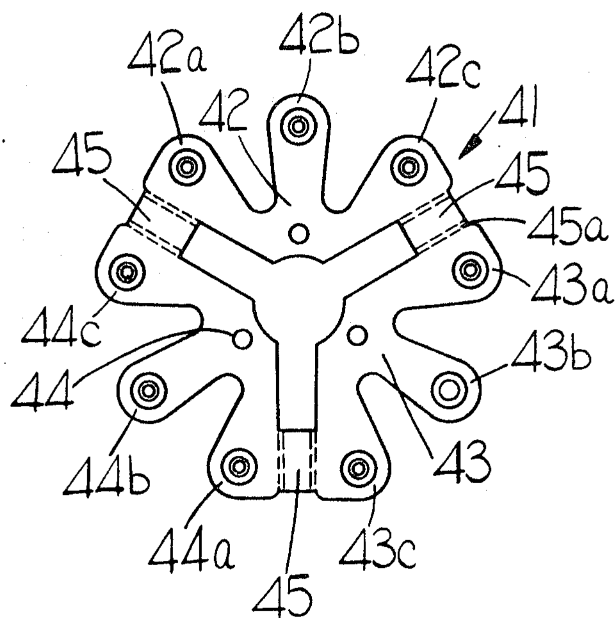
Figure 2:
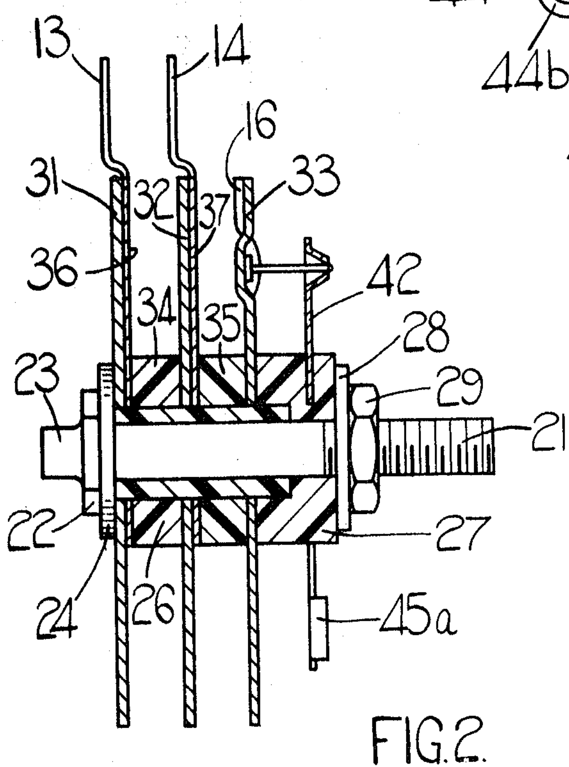
Figure 4:
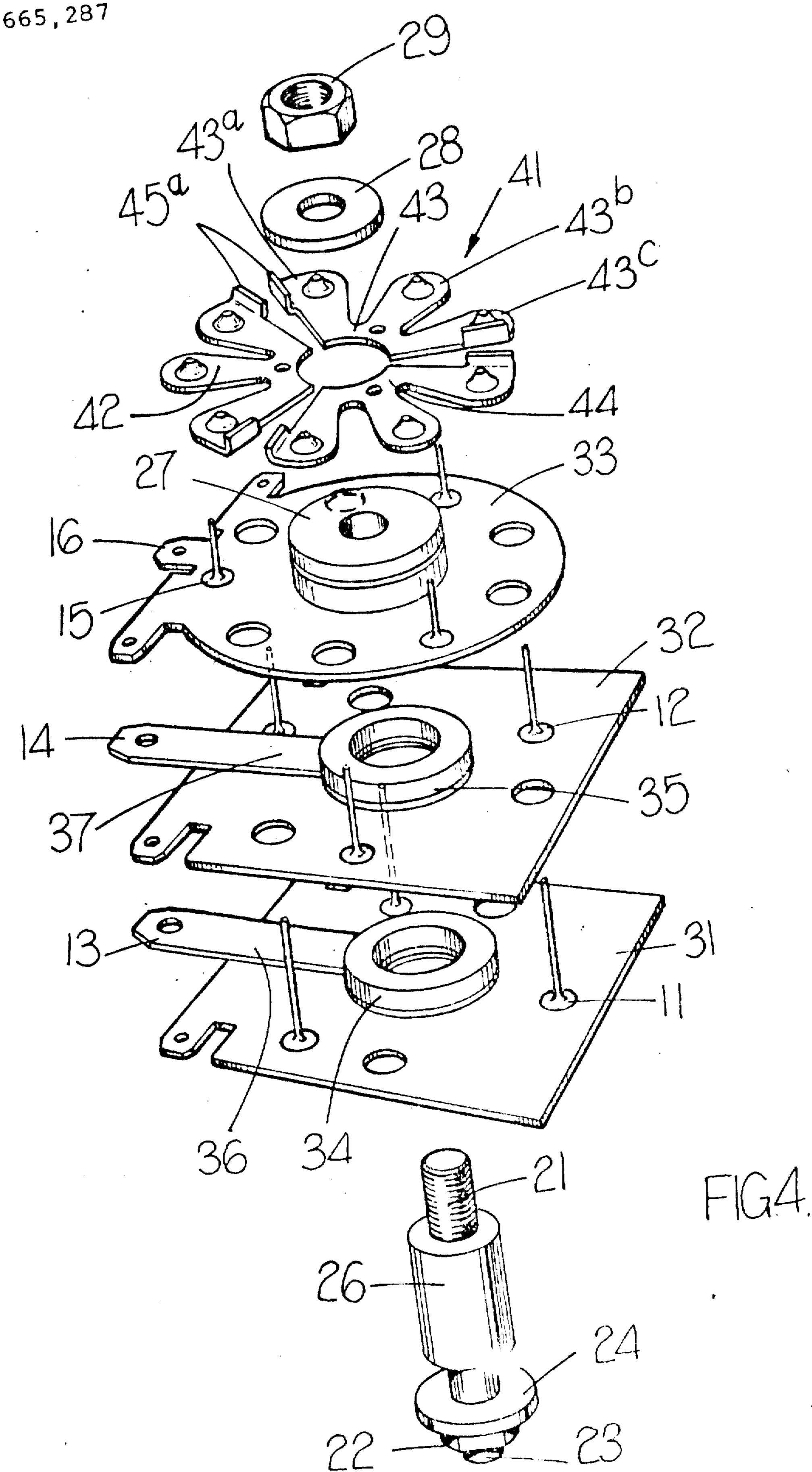

An example of the invention is illustrated in the accompanying drawings, in which FIG. 1 is a circuit diagram, FIG. 2 is a vertical section through the assembly, FIG. 3 shows the plate from which the phase plates are formed, and FIG. 4 is an exploded view of the entire assembly.

The construction shown is intended to be mounted within a three-phase alternator utilizing a road vehicle, so as to provide an output for charging the battery, and a subsidiary output for operating an indicator lamp on the road vehicle. The circuit diagram is shown in FIG. 1, from which it will be seen that the full wave rectifier consists of three pairs of diodes 11, 12, each pair being connected in series and the junctions of the three pairs being connected to the phase points of the alternator. The anodes of the diodes 11 are connected to an earth terminal 13, and the cathodes of the diodes 12 are connected to a positive supply terminal 14. The subsidiary connection is taken from the phase points to the anodes of three diodes 15, the cathodes of which are connected to a terminal 16.

The assembly includes a screw-threaded bolt 21 having a head 22 at one end from which extends a post 23, the post 23 being engaged in use with part of the alternator casing to support and earth the assembly. Surrounding the bolt 21 in contact with the head 22 is a metal washer 24, and extending from the washer 24 and surrounding the bolt 21 is an insulating sleeve 26. The sleeve 26 is surrounded by three plates 31, 32, 33 which are spaced apart and insulated from one another by washers 34, 35 surrounding the sleeve 26, and by an insulating moulded cylindrical body 27 in facial contact with the plate 33, the sleeve 26 terminating within the stepped bore in the body 27, and the bolt 21 extending through the entire body 27 and being engaged by a washer 28 and a nut 29 holding the assembly in position.

The plate 31 is earthed by way of the washer 24 and the bolt 21. The terminal 16 is formed integrally with the plate 33, and the terminals 13 and 14 are formed integrally with round plates 36 and 37 which are held in facial contact with the plates 31 and 32 respectively. It would, of course, be possible to provide terminals integral with the plates 31 and 32, but it is more economical to provide the separate plates 36 and 37, so avoiding wastage of material which is inevitable if the plates 31 and 32 are to be stamped with integral terminals.

The plate 31 carries the diodes 11, with the anodes of the diodes 11 connected to the plate 31. Considering the plates 36 to extend vertically as shown, then the angular positions of the diodes 11 on the plate 31, with the bolt 21 as axis, are 40°, 160° and 280°. The plate 32 carries the diodes 12, with the cathodes of the diodes connected to the plate 32, and the diodes arranged angularly at angles of 800°, 200° and 320° respectively. The plate 33 carries the diodes 15, with the cathodes of the diodes connected to the plate and the diodes angularly spaced at 120°, 240° and 360° respectively, the diode which is at 360° being seen together with its connecting lead in FIG. 2, but the other diodes and their connecting leads being omitted for clarity.

Referring now to FIG. 3, there is shown a plate indicated generally by reference 41 and which is to be formed into three phase plates. The plate 41 is stamped as shown in three parts 42, 43, 44 each of which has three fingers indicated by the reference numeral of the part with suffix *a*, *b* or *c*. Integral portions 45 of the plate interconnect the portions **42*c* and 43*a*, 43*b* and 44*a*, and 44*c* and 42*a*. The insulating body 27 is molded around the plate 41, and the portions 45 are then slit centrally and bent through 90° to provide flanges 45*a*. The body is then placed on the bolt 21 in the position shown in FIG. 2, leaving the three phase plates 42, 43, 44 separate from each other, but all lying in the same plane and supported by the body 27. The body 27 is mounted with the finger 42*b* vertical, and the remaining fingers angularly spaced relative to the bolt 21** by increments of 40°.

The terminals of the nine diodes which are not connected to one of the plates 31, 32 or 33 have leads connected thereto and these leads extend in an axial direction. Where necessary, holes are formed in the plates 37 and 33 to accommodate leads extending in the axial direction. It will readily be seen that because of the disposition of the phase plates relative to the plates 31, 32 and 33, each phase plate will have presented to it a lead from one of each of the diodes 11, 12 and 15. These leads are connected to the phase plates, which are then connected to the phases of the alternator, so that a rectified output appears between the terminals 13 and 14, a separate rectified output appears between the terminals 13 and 16.

The connection of the leads to the phase plates is conveniently made by dip soldering, and during this operation the six flanges **45*a*** serve to support the assembly in the soldering apparatus and prevent flow of solder into the gaps between the three phase plates, so minimizing the risk of the phase plates being short-circuited during the soldering operation.

The arrangement of the phase plates on an insulating body permits the overall length of the construction to be reduced, and also reduces the overall cost, because the assembly is simplified. The shaping of the phase plates into individual but interconnected fingers for receiving the diodes enables the individual fingers to move axially relative to the other fingers on a phase plate, so minimizing risk of a lead snapping as a result of vibration in use.

Having thus described our invention what we claim as new and desire to secure by Letters Patent is:

1. A full wave rectifier assembly comprising in combination an axially extending support member, a pair of terminal plates mounted on said support member and insulated from one another, each terminal plate carrying a number of diodes equal in number to the number of phases of the supply to be rectified, the diodes carried by one terminal plate having their cathodes electrically connected thereto, and the diodes carried by the other terminal plate having their anodes electrically connected thereto, a plurality of phase plates equal to the number of phases to be rectified, the phase plates being fixedly disposed at the same axial location about and relative to the support member and being insulated from one another and from the terminal plates, and leads interconnecting the diodes and phase plates so that when the phase plates are connected to the phases of an a.c. source, a rectified supply will be obtained at the terminal plates, the phase plates being constructed from a single plate around which is moulded an insulating body used to support the phase plates relative to the support member, said single plate being split to separate the phase plate from one another.

2. An assembly as claimed in claim 1 in which each phase plate is shaped so that the parts of each phase plate to which leads are secured are movable relative to each other axially.

3. An assembly as claimed in claim 1 in which said single plate has a plurality of integral portions interconnecting the parts of the plate which are to constitute the phase plates, each of said portions being split and then bent through 90° to provide flanges extending from the phase plates away from the terminal plates.

4. An assembly as claimed in claim 1 in which at least one terminal plate is mounted on the support member in facial contact with a further plate providing the actual output terminal.

* * * * *

UNITED STATES PATENT AND TRADEMARK OFFICE
CERTIFICATE OF CORRECTION

PATENT NO. : 3,665,287 — Page 1 of 2

DATED : May 23, 1972

INVENTOR(S) : Dennis Rowland Cross et al.

It is certified that error appears in the above—identified patent and that said Letters Patent is hereby corrected as shown below:

Sheet 2 of the drawings comprising Figure 4 as shown on the attached sheet should be included as part of Letters Patent.

On the title page, "3 Drawing Figures" should read -- 4 Drawing Figures --.

Signed and Sealed this

*Second* Day of *February 198[illegible]*

[SEAL]

*Attest:*

GERALD J. MOSSINGHOFF

*Attesting Officer* — *Commissioner of Patents and Trademarks*